United States Patent [19]

Watson

[11] Patent Number: 4,793,590
[45] Date of Patent: Dec. 27, 1988

[54] PILOTED CHECK VALVE

[75] Inventor: Richard R. Watson, Bellaire, Tex.

[73] Assignee: Gilmore Valve Company, Bellaire, Tex.

[21] Appl. No.: 484,828

[22] Filed: Apr. 14, 1983

[51] Int. Cl.[4] ............................................. F16K 31/143
[52] U.S. Cl. ................................. 251/63.5; 251/361; 251/368
[58] Field of Search ............... 251/368, 362, 361, 62, 251/63.5, 63.4, 363, 63

[56] References Cited

U.S. PATENT DOCUMENTS

| 2,634,751 | 4/1953 | Borer | 251/63.4 |
|---|---|---|---|
| 2,682,890 | 7/1954 | May | 251/63.5 |
| 2,783,020 | 2/1957 | Kleczek | 251/63.5 |
| 2,934,315 | 4/1960 | Kenann | 251/362 |
| 3,022,978 | 2/1962 | Kowalski et al. | 251/362 |
| 3,145,733 | 8/1964 | Shaw et al. | 251/368 |
| 3,443,789 | 5/1969 | Glasgow et al. | 251/368 |
| 3,529,624 | 9/1970 | Cryder et al. | 251/361 |
| 3,540,472 | 11/1970 | Brady | 251/368 |
| 3,787,027 | 1/1974 | Curnow et al. | 251/63 |
| 4,040,600 | 8/1977 | Coppola et al. | 251/63.5 |
| 4,076,210 | 2/1978 | Spielvogel | 251/63.5 |
| 4,391,293 | 7/1983 | Keenan | 251/63.5 |
| 4,421,292 | 12/1983 | Matsui et al. | 251/63.4 |
| 4,461,449 | 7/1984 | Turner | 251/63.5 |

FOREIGN PATENT DOCUMENTS 2415733  9/1979  France ........................... 251/63.4

*Primary Examiner*—Samuel Scott
*Assistant Examiner*—Noah Kamen
*Attorney, Agent, or Firm*—David A. Rose

[57] ABSTRACT

A piloted check valve includes a closure that is pressure balanced to relieve pressure on non-metallic seat when valve is closed against high pressure differential. The closure includes a disc having a stem moving in a sealed chamber communicating through the stem and disc with the interior of the valve seat opening. The chamber is provided by a cylindrical wall received in a socket in the valve body. The closure disc has a lip engaging the seat, the lip I.D. being about equal to that of the seat opening and the valve stem.

10 Claims, 1 Drawing Sheet

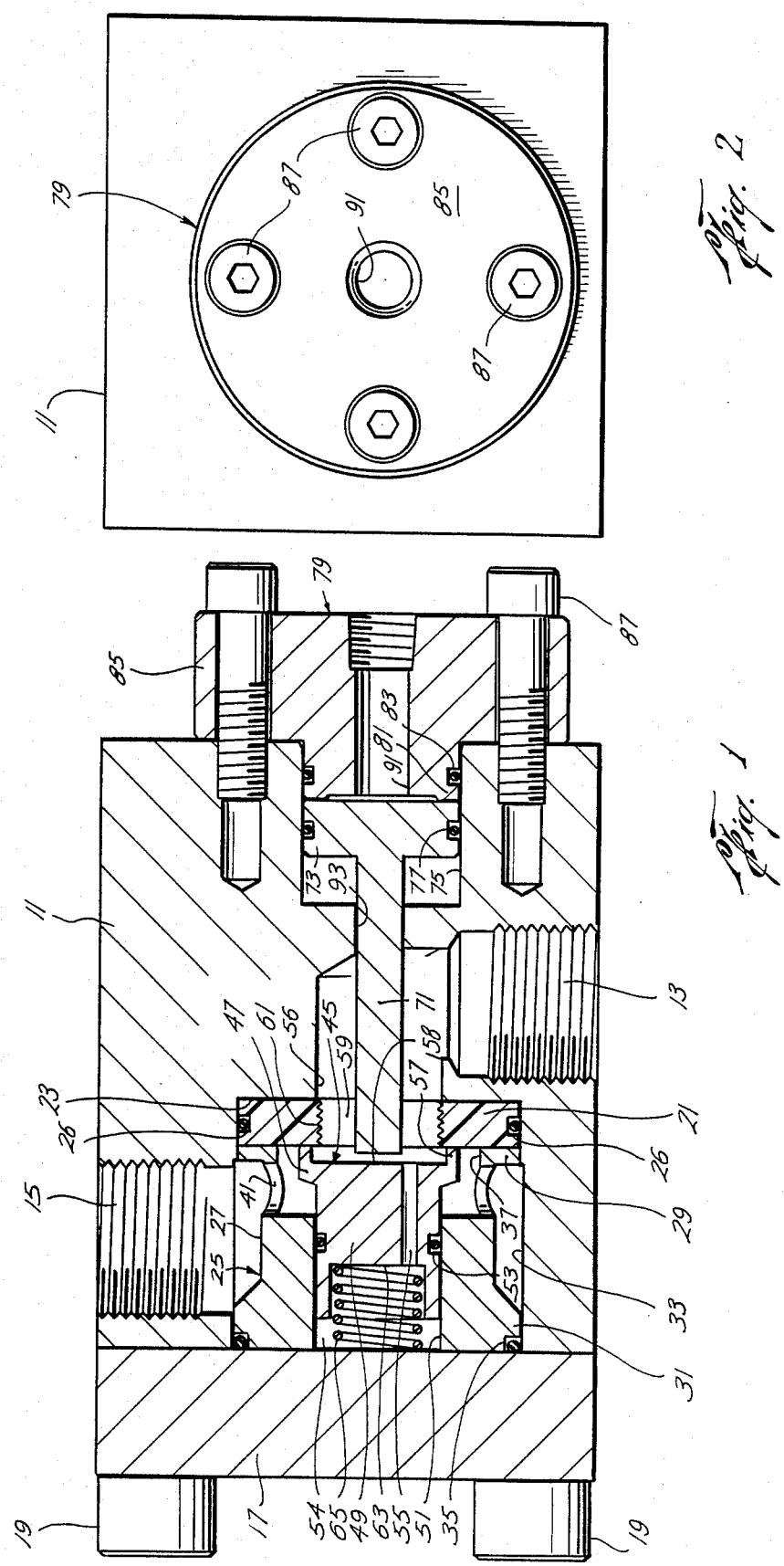

PILOTED CHECK VALVE

SUMMARY OF THE INVENTION

This invention relates to valves and more particularly to a piloted check valve which may be used, e.g. to lock a high pressure hydraulic piston in position.

According to the invention, a non-metallic seat is employed to insure that the valve is fluid tight, and the metallic closure element is sufficiently pressure balanced so that the pressure on the sealing area of the valve seat transmitted to the seat when the valve is closed is about the same as the pressure on the sealing area when the valve is open, whereby the valve seat is not cut by the closure even though the fluid being controlled is at high pressure differential.

The low pressure side of the valve closure when the check valve has closed to prevent back flow may be called the feed side, in that when the valve is open fluid on the feed side may be fed from a fluid source connected to a first flow port in the valve body and through the valve seat passage and out a second flow port in the valve body to a hydraulic cylinder connected to the second flow port.

The other side of the valve closure may be called the bleed side, in that when the valve is open fluid in the hydraulic cylinder may bleed off through the second flow port and the valve seat passage and thence out through the first flow port.

In other words, when the hydraulic cylinder is being fed, the upstream or high pressure side of the closure is the feed side, and when the cylinder is being bled off, the upstream or high pressure side of the closure is the bleed side.

The valve closure is of the poppet type, i.e. the closure reciprocates or moves transversely to and from its seat, which is planar. The closure is constrained to its reciprocating motion by a valve stem on the bleed side of the closure, the stem moving in a guide cylinder to which the stem is slidingly sealed by an O-ring. The stem outer diameter is about equal to the inner diameter of the valve seat passage. The guide cylinder is closed by a bonnet at its end opposite from that where the stem enters, forming a balancing chamber. An equalizer passage through the stem equalizes pressure in the balancing chamber and at the feed side of the closure. A coil spring in the balancing chamber urges the closure into engagement with the seat. A rod connected to a pilot piston extends through the valve seat passage to engage a recessed face on the feed side of the closure to move the closure away from the seat to open the valve, e.g. when it is desired to bleed a hydraulic cylinder connected to the second flow port of the valve.

BRIEF DESCRIPTION OF THE DRAWINGS

For a detailed description of a preferred embodiment of the invention, reference will now be made to the accompanying drawings wherein:

FIG. 1 is a section through a valve embodying the invention, taken along the axis of the valve stem, and FIG. 2 is an end view of the valve shown in FIG. 1, The drawings are to scale and the conventions of the office for indication of materials have been employed, from which it will be seen that the parts are made of metal, except for the O-rings which are made of an elastomer, e.g. rubber, and the valve seat which is made of plastics material.

DESCRIPTION OF PREFERRED EMBODIMENT

Referring to FIGS. 1-3, there is shown hollow body 11 having a rectangular exterior and a stepped cylindrical interior. The body has a first flow port 13 and a second flow port 15. Bonnet 17 closes the open end of the body, being held in place by four socket headed cap screws 19 (only two of which appear in the drawing).

Within the body between ports 13 and 15 is valve seat ring 21. Ring 21 is made of a hard plastics material such as Delrin, having for example, a hardness of in the range of M90-98, e.g. M-94 Rockwell. Seat ring 21 is held against annular shoulder or step 23 in the interior of the valve body by annular cage 25 which in turn is held in position by bonnet 17. An annular groove 26 about the seat ring receives an O-ring to seal the seat to the body.

Cage or cylindrical wall 25 is spool shaped, having a central tubular portion 27 and end flanges 29 and 31 which fit snugly within cylindrical opening 33 in the valve body. An annular rabbit 35 in flange 31 receives an O-ring to seal the cage to the valve body. The inner end of the cage is counterbored at 37 and provided with a plurality of radial ports 41.

Within the cage is valve closure 45 comprising a circular disc 47 and a generally cylindrical stem 49. Stem 49 fits slidably within the cylindrical interior portion 51 of the cage. The stem is provided with an annular groove 53 receiving an O-ring to make a sliding seal with the cage, thereby sealing off bonnet chamber 54 formed between the valve stem, cage and bonnet. An off axial equalizer passage 55 extends through the closure from the feed side to the bleed side to equalize the pressure in bonnet chamber 54 with that in valve body chamber 56 adjacent first flow port 13.

The feed side of the closure disc is relieved at 58 leaving an annular seal lip 57 to engage and seal with annular seat ring 21. The diameter of passage 59 through seat ring 21 is the same substantially as the outer diameter of stem 49 so that the area of closure disc 49 subject to pressure differential when the valve is closed is about equal to the contact area between seal lip 57 and seat ring 21. The inner diameter of lip 57 is only slightly larger than the diameter of passage 59 as required to assure that the lip does not overlap the inner periphery of the seat ring where any irregularities might interfere with proper seating of the closure disc. In this connection it is to be noted that the inner periphery of the seat ring is threaded at 61 to receive an installation or replacement tool.

Valve stem 49 is recessed at 63 forming a socket to receive coil spring 65 which bears against the stem at one end and at the other end against bonnet 17. Spring 65 biases the valve closure to closed position, i.e., engagement with the valve seat, but exerts a very small force compared to that exerted by pressure differential across the closure lip under expected operating conditions. For example with a pressure differential of two thousand psi over a lip area of one quarter square inch there will be a closure force of five hundred pounds compared to perhaps one pound spring force.

To overcome the spring and any differential fluid pressure to open the valve whenever desired, actuator rod 71 is provided, extending from pilot piston 73 concentrically through seat ring passage 59. The piston reciprocates in pilot cylinder 75 formed in the valve body. Piston 73 is provided with an annular groove 77 receiving an O-ring to form a sliding seal with cylinder 75. The outer end of cylinder 75 is closed by head 79 which includes a cylindrical plug 81 having an external groove 83 receiving an O-ring to seal with the cylinder. Head 79 further includes a flange 85 secured to the valve body by four socket headed cap screws 87.

A port 91, threaded at its outer end for connection to a source of fluid pressure, admits pressure fluid to cylinder 75 to bear on piston 73 and move actuator rod 71 to engage valve closure disc 47 and push it off its seat. Actuator rod 71 will be moved in the opposite direction by the force of spring 65 and any fluid pressure differential on the valve closure when the fluid pressure on pilot piston 73 falls. The slight gap shown between the actuator rod and valve closure is merely a manufacturing tolerance. When rod 71 reciprocates back and forth it is guided by loose fitting bearing 93.

As an example of use of the valve, it may be employed in the line between a source of hydraulic fluid connected to valve flow port 13 and a hydraulic cylinder actuating a subsea blowout preventer for an oil well, the latter cylinder being connected to valve flow port 15. When pressure at port 13 rises and opens the check valve, pressure fluid moves to the preventer hydraulic cylinder to close the preventer. Thereafter, if the pressure at port 13 drops, the check valve closes and keeps the preventer closed until the actuator rod, controlled by the pilot cylinder, opens the check valve. Opening of the check valve by the pilot actuator rod is synchronized with applications of pressure to the opposite side of the preventer hydraulic cylinder for reopening the preventer. When the check valve opens and the preventer cylinder's piston moves to open the preventer, fluid from the closing side of the preventer cylinder is bled off back through flow port 15, the check valve, and flow port 13.

While a preferred embodiment of the invention has been shown and described, modifications thereof can be made by one skilled in the art.

I claim:

1. A pilot locked poppet check valve comprising:
   a valve body having a hollow interior and first and second flow ports extending from the hollow interior to the exterior of the body, forming with the hollow interior a flow passage through the body,
   a valve seat around said flow passage having an opening therethrough communicating portions of said flow passage on opposite sides of said seat,
   a valve closure in said flow passage moveable between a closed position in which the closure is in engagement with said seat at one end of said opening through the seat to fully block flow through the flow passage and an open position in which the closure is away from said seat leaving the flow passage open for the flow of fluid therethrough from said first port through a first part of said flow passage to said seat and thence through said seat to said end of the opening therethrough into a second part of said flow passage and past said closure to said second port and vice versa, the cross sectional area of said closure perpendicular to the direction of movement of the closure toward the seat being larger than the cross-sectional area of the opening through the seat where the closure engages the seat,
   resilient means biasing said closure to closed position,
   valve closing means responsive to fluid pressure in said second part of the flow passage when the valve is closed for holding the valve closure in closed position, said valve closing means comprising surface on said closure exposed to fluid pressure in said second part of the flow passage, said valve closing means being effective when the closure is in closed position to assist said resilient means, the surface of said valve closure subject to fluid pressure in said second part of said flow passage when the valve is closed producing in response to the last said fluid pressure a resultant force in said direction tending to hold the valve closed,
   a rod extending in said passage in said valve body with clearance between the outer periphery of the rod and the inner periphery of said passage leaving room for fluid flow through said passage, said rod being separate from said closure and moveable between a position engaging said closure and a position out of engagement with said closure,
   hydraulic means connected to said rod for moving the rod, when the hydraulic means is actuated, to a position in engagement with said closure holding the closure in open position and for allowing the rod, when the hydraulic means is unactuated, to move with the closure as the closure means moves to closed position under the force of said resilient means,
   balancing means which when the valve closure is in closed position, shields a first portion of the surface of said closure, other than the portion of the surface of the closure engaging the seat, from the fluid pressure in said second part of the flow passage and exposing said first portion to fluid pressure in said first part of the flow passage, and
   valve opening means responsive to fluid pressure in said first part of the flow passage when the valve is closed for moving the valve closure to open position, said valve opening means comprising surface on said closure exposed to fluid pressure in said first part of the flow passage, said valve opening means being effective to move said closure to open position upon occurrence of fluid pressure in said first part of the flow passage sufficient to overcome said resilient means and the effect of fluid pressure on surface of said closure subject to fluid pressure in said second part of the passage, said valve opening means being effective when said hydraulic means is unactuated and said rod is out of engagement with said closure.

2. Valve according to claim 1, said balancing means including
   a stem connected to said closure on the side thereof opposite from said seat, and
   a cylindrical wall axially, slidably receiving said stem in sealed relationship,
   a port through said stem and closure communicating the volume inside said wall with said opening in the valve seat when the closure is in closed position,
   said seat being a ring,
   said body having a cylindrical opening concentric with said rod forming an annular step around said flow passage receiving said seat,
   said cylindrical wall having a cylindrical exterior and being received in said cylindrical opening in fluid tight relationship;
   said body including a bonnet closing said opening and holding said cylindrical wall against said seat.

3. Valve according to claim 2, said cylindrical wall having port means therethrough forming part of said second part of said fluid passage.

4. Valve according to claim 2,
said cylindrical wall having a counterbore adjacent said seat,
said closure being a disc extending radially into said counterbore.

5. Valve according to claim 2,
said stem having a diameter substantially equal to the diameter of said opening through the seat ring.
said closure being a metallic disc and said seat ring being non-metallic and softer than said disc,
said disc being recessed adjacent said seat leaving an annular lip at the outer periphery of the disc of only slightly larger inner diameter than said opening through said seat ring.

6. Valve according to claim 5,
said lip and seat having planar faces,
said stem and cylindrical wall guiding said closure disc in its travel between open and closed position and providing means accurately to position the face of the lip of said metallic disc flush with said face of said non-metallic seat ring.

7. Valve according to claim 2,
said hydraulic means comprising a cylinder and a piston reciprocatable within the cylinder, said rod being connected to said piston, said cylinder being coaxial with said cylindrical wall, and
means for admitting to and releasing from said cylinder a hydraulic fluid for actuating the piston,
said port through said closure being parallel to but offset from said axis of said cylindrical wall and emerging from said closure at a location to one side of the area of the closure contacted by said rod.

8. Valve according to claim 7, said resilient means comprising a spring between said bonnet and said stem, said stem having a socket to receive said spring, said port emerging from said stem into said socket laterally of said spring.

9. Valve according to claim 1,
said portion shielded by said balancing means having an area parallel to said seat substantially equal to the area of said closure subject to fluid pressure in said opening in said seat which latter area is within the inner perimeter of engagement of said closure with said seat whereby the fluid pressure differential acting on said closure tending to open and close the valve is substantially effective only over the area of said engagement thereby minimizing the pressure between closure and seat.

10. Valve according to claim 1,
said balancing means exposing said first portion of the surface of the closures to fluid pressure in said first part of the flow passage including an equalization port through said closure which emerges from said closure on the side thereof adjacent said first part of the flow passage at an area to one side of the area of said closure that is contacted by said rod when said hydraulic means is actuated.

* * * * *